United States Patent

Soma

[15] 3,651,544
[45] Mar. 28, 1972

[54] GRIPPING BAND FOR BUNDLE OF WIRES

[72] Inventor: Yoshio Soma, Tokyo, Japan
[73] Assignee: Nikko Kogyo Kabushiki Kaisha, Tokyo, Japan
[22] Filed: Aug. 5, 1970
[21] Appl. No.: 61,366

[30] Foreign Application Priority Data

Mar. 12, 1970 Japan..................................45/23270

[52] U.S. Cl............................................24/16 R, 24/243 M
[51] Int. Cl. ......................................................A44b 21/00
[58] Field of Search..............24/16, 73 SA, 243 M, 241 WB, 24/263 DC, 263 SC, 158 P, 255 C, 260

[56] References Cited

UNITED STATES PATENTS

| | | | |
|---|---|---|---|
| 2,166,585 | 7/1939 | Evans | 24/260 X |
| 3,124,856 | 3/1964 | Fleminger | 24/255 SL UX |
| 740,648 | 10/1903 | Heaton | 24/158 P |
| 3,512,228 | 5/1970 | Carvell | 24/243 M |

Primary Examiner—Donald A. Griffin
Attorney—Waters, Roditi, Schwartz & Nissen

[57] ABSTRACT

A combination of a resilient inner ring having a portion cut away to form an expansible gap and a resilient outer ring similarly having a portion cut away to form an expansible gap. The outer ring is slidably received in a circumferential groove formed in the outer peripheral surface of the inner ring. The inner ring is provided with an axial ridge on the inner surface thereof for preventing relative rotation of a bundle of wires gripped thereby and with an axial ridge on the outer surface thereof across the circumferential groove for engagement with one end of the outer ring to prevent relative rotation of said inner and outer rings.

3 Claims, 11 Drawing Figures

Patented March 28, 1972 3,651,544

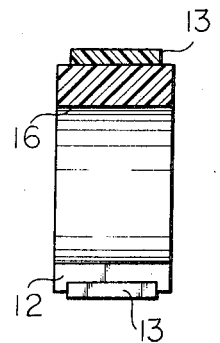
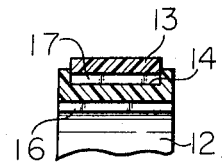
Fig. 4 Fig. 5
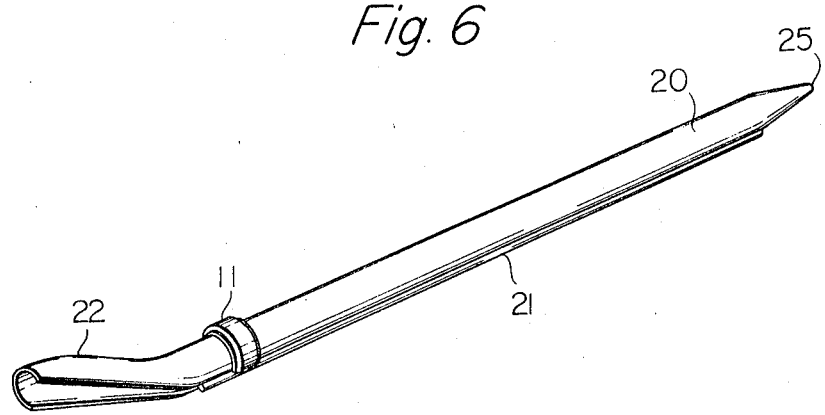
Fig. 6
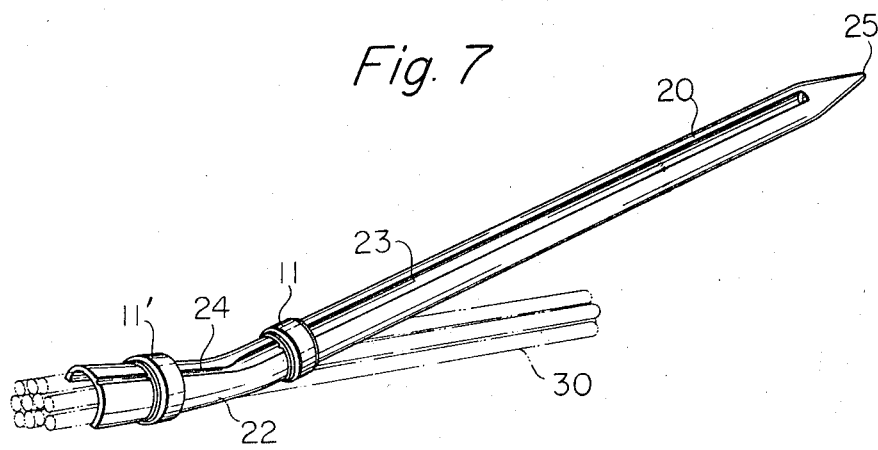
Fig. 7

GRIPPING BAND FOR BUNDLE OF WIRES

BACKGROUND OF THE INVENTION

1. Field of the Invention:

The present invention relates to a gripping band for a bundle of wires and more particularly to such gripping band for a bundle of wires which comprises in combination an inner split ring having a gap formed therein and an outer split ring similarly having a gap formed therein and slidably mounted on the outer peripheral surface of said inner split ring.

2. Description of the Prior Art:

For gripping a bundle of wires to retain the individual wires in position, it has been proposed to lap an adhesive tape around the bundle of wires and adhesively band it thereto, to lap a belt around the bundle of wires and tighten it by means of a buckle provided at one end thereof, to lap a plastic tape around the bundle of wires one turn and secure the opposite ends thereof to the bundle either directly or indirectly after putting them together, or to put a single resilient split ring, having a gap therein, astride on the bundle of wires upon expanding said gap and tighten the bundle by the radial compressive force of said ring.

The use of an adhesive tape, e.g., Scotch tape, is advantageous in that the bundle of wires can be positively gripped by the tape tightly bonded thereto and the individual wires are not permitted to slip out of the bundle, but on the other hand, the operation of lapping the tape around the bundle is cumbersome. In addition, where the type used is not elastic, it occasionally cannot follow a deformation of the bundle when the bundle is deformed or expanded in the radial direction, and it is possible that the tape is broken when the bundle expands radially. Another disadvantage is that the relative position of the tape and the individual wires cannot be maintained when one of the wires is drawn out from the bundle or the bundle contracts in the radial direction. It is also to be noted that the adhesive tape cannot be used for a bundle of wires which is to be used at high ambient temperatures, since the adhesive on the adhesive tape is thermally instable.

The use of a belt and a buckle is unsatisfactory in that a sufficient gripping force of the belt cannot be maintained if the locking engagement between the belt and the buckle is loosened by vibration or for other reasons. The use of a plastic tape is not satisfactory either, because, since the tape does not press the bundle of wires radially inwardly constantly, the relative position of the tape and the individual wires undergoes a change, similar to the case of using an adhesive tape, upon removal of a wire from the bundle or radial contraction of the bundle.

The use of a resilient split ring is advantageous, on one hand, in that a bundle of wires can effectively be gripped even when the bundle is expanded or contracted in the radial direction or a wire is drawn out of the bundle, because the ring grips the bundle by its compressive force, but has the disadvantage, on the other hand, that the ring is not adapted for use in gripping a bundle of fine wires because, if the diameter of the wires is smaller than the width of the gap formed in the ring, the wires will slip out through the gap, causing a collapse of the bundle.

SUMMARY OF THE INVENTION

The present invention has been made with a view to overcoming the aforesaid disadvantages of the conventional wire gripping means. According to the invention, there is provided a resilient, expansible gripping band for a bundle of wires, which comprises in combination a resilient, expansible, inner split ring having an axial gap formed between the confronting ends thereof and a continuous circumferential groove formed in the outer peripheral surface thereof, and a resilient, expansible, outer split ring having an axial gap formed between the confronting ends thereof and being slidably received in the circumferential groove of said inner ring.

On the inner peripheral surface of the inner ring is provided an axially extending ridge which will hold a bundle of wires against rotation relative to said inner ring when gripped by said inner ring. On the outer peripheral surface of the inner ring is provided an ear, or ridge extending across the circumferential groove, which will hold the outer ring against sliding movement in said circumferential groove by abutment against one end of said outer ring when the gripping band is fitted around the bundle of wires and the outer ring is placed in position, covering the gap of the inner ring, upon sliding movement in said circumferential groove.

Because of the construction described above, when the gripping band of the invention is fitted around the bundle of wires to grip the same, the gap of the inner split ring is covered by a portion of the outer split ring and not held in registration with the gap of the outer split ring. Therefore, in no case will one or more wires be allowed to slip out of the bundle through the gaps.

It is also to be noted that, since the gripping band of the invention is capable of expansion or contraction following an expansion or contraction of the bundle of wires in the radial direction, the bundle can always be maintained in its shape. Even when the bundle becomes smaller in diameter as a result of one of the constituent wires being drawn out of the bundle, the gripping band contracts automatically immediately, following the decreasing diameter of the bundle, under its own resilient compressive force, whereby the bundle of wires is continuously gripped by the gripping band positively.

Another important feature of the gripping band according to the invention is that it can be fitted around the bundle of wires in a very simple manner, only by expanding the inner and outer split rings to increase the gaps thereof and putting them on the bundle astride.

These and other features and advantages of the invention will be more fully understood from the following detailed description when taken in conjunction with the accompanying drawings.

BRIEF DESCRIPTION OF THE DRAWINGS

FIG. 4 is a cross-sectional view taken along the line IV—IV of FIG. 1;

FIG. 5 is a cross-sectional view taken along the line V—V of FIG. 1;

FIG. 6 is a perspective view of a gripping band charging device;

FIG. 7 is a perspective view showing the manner of placing the gripping band around the bundle of wires by means of the charging device shown in FIG. 6;

FIGS. 8–11 are views of another embodiment of the gripping band according to the invention, in which:

FIG. 8 is a perspective view of the gripping band as fitted around a bundle of wires;

FIG. 9 is a front elevational view, partially cut away, of the gripping band;

FIG. 10 is a side view along the line X—X of FIG. 9; and

FIG. 11 is a front elevational view, partially cut away, of the outer ring of the gripping band.

DESCRIPTION OF THE PREFERRED EMBODIMENTS

Figure 1:
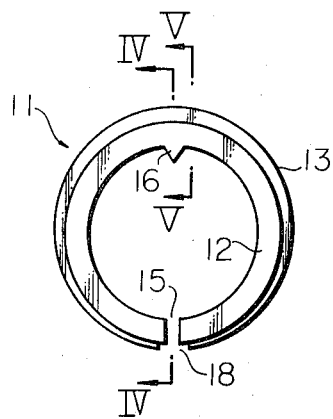
FIG. 1 is a front elevational view of one embodiment of the gripping band according to the present invention.
Figure 2:
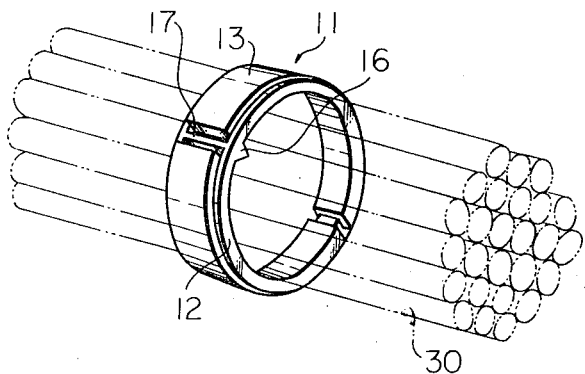
FIG. 2 is a perspective view of the gripping band as fitted around a bundle of wires.
Figure 3:
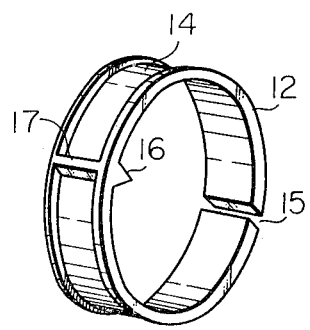
FIG. 3 is a perspective view of the inner split ring.
Figure 8:
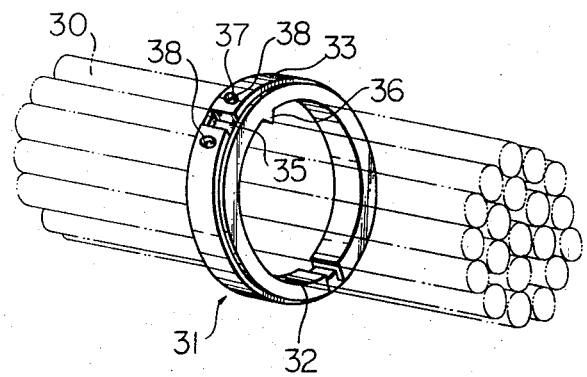
Figure 9:
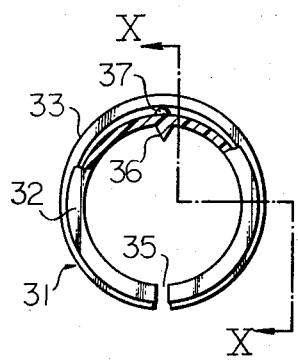
Figure 10:
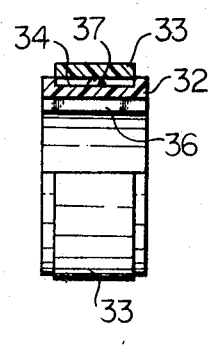
Figure 11:
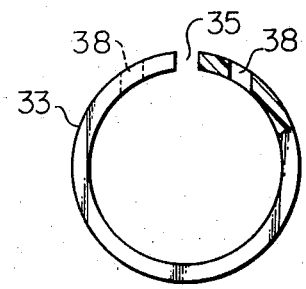

Referring first to FIG. 1, there is shown one form of the gripping band for a bundle of wires according to the invention, which is generally indicated by numeral 11. The gripping band 11 comprises in combination an inner split ring 12 and an outer split ring 13. The inner split ring 12 has a circumferential groove 14 formed in the outer peripheral surface thereof, in which the outer split ring 13 is slidably mounted. Further, the inner split ring 12 has an axial gap 15 formed between the confronting ends thereof and also has a ridge 16 formed on the inner peripheral surface thereof at a location diametrically opposite to said gap 15, extending parallel to said gap or in an axial direction of said ring. The ridge 16 is preferably of the shape of a triangular prism. In the circumferential groove 14 of the ring 12 is formed a ridge 17 at a location opposite to the ridge 16, extending across said groove. On the other hand, the outer split ring 13 has a gap 18 formed between the confronting ends thereof, similar to the inner split ring 12, and the width of said gap 18 is preferably equal to or slightly larger than the width of the gap 15. When the outer split ring 13 is fitted on the circumferential groove 14 of the inner split ring 12, with the gaps 15 and 18 of the respective rings in registration with each other, a portion of the outer split ring 13 rides on the ridge 17. Therefore, the height of the outer split ring 13, projecting outwardly from the outer peripheral surface of the inner split ring 12 in the vicinity of the gap 15, is smaller than the height of the same projecting from the outer peripheral surface of the inner split ring at the diametrically opposite position, as shown in FIG. 1. These inner and outer split rings 12 and 13 are preferably formed of a resilient, deformable material, such as acetal resin. It should be understood, however, that the material is not restricted only to such resin and other resilient, deformable resins and metals may also be used either singly or in combination.

For fitting the gripping band 11 around a bundle of wires 30 to grip the latter, a charging device 20 as shown in FIG. 6 is used. The charging device 20 consists of an elongate rod of circular cross section having an elongate ridge 21 formed on one side along the length thereof. The charging device 20 has a bill 22 which is formed by flexing one end of the rod on the side opposite to the ridge 21 from the point where said ridge 21 terminates. The bill 22 is formed by a substantially semicylindrical wall, having a substantially crescent cross section and being open on the same side as the ridge 21, and diverging toward the free end thereof. The charging device 20 also has an elongate groove 23 formed along the length thereof on the diametrically opposite side surface with respect to the ridge 21. The groove 23 serves to guide the triangular prismatic ridge 16 received therein when the gripping band 11 is mounted on the charging device 20 and slided thereon in the longitudinal direction. The bill 22 has a longitudinal groove 24 formed in the outer surface thereof, which is communicated with said groove 23. The other end 25 of the charging device 20 is converged to facilitate the mounting of the gripping band 11 on said charging device.

The gripping band 11 is fitted around a bundle of wires 30 in the following manner: Namely, the inner and outer split rings 12 and 13 are moved relative to each other so as to register the gaps 15 and 18 of the respective rings with each other. Then, the gripping band 11 is placed on the charging device 20 from the end 25 of said charging device, with the latter extending through the former. In this case, the triangular prismatic ridge 16 is received in the groove 23 of the charging device 20 and the opposite ends of the inner and outer split rings 12 and 13 are positioned on both sides of the ridge 21. The gripping band 11 is moved toward the bill 22 longitudinally of the charging device 20, with the ridge 16 being guided by the groove 23. In this condition, the bill 22 is applied over the bundle of wires 30 and then the gripping band 11 is moved toward the free end of the bill 22 to a position indicated by numeral 11', with the ridge 16 being guided by the groove 24 of said bill. Since the bill 22 is diverged toward the free end thereof, the inner and outer split rings of the gripping band are expanded and thus the gaps of the respective rings are enlarged, progressively.

Finally, the gripping band 11 is slipped off the bill 22, whereupon it is fitted around the bundle of wires 30 and the inner and outer split rings 12 and 13 of said band contract to their original shapes under the resilient force thereof, firmly gripping the bundle. Thereafter, the outer split ring 13 is slidingly rotated relative to the inner split ring 12, along the groove 14 of said inner split ring, until one end of the outer split ring 13 abuts against the ridge 17 of the inner split ring 12 to stop the relative movement. In this state of the gripping band, the gap 15 of the inner split ring 12 is covered by the outer split ring 13, so that a constituent wire or wires of the bundle 30 are not allowed to slip out of the gripping band through the gap 15. Further, the bundle of wires 30 is held against an angular displacement relative to the inner split ring 12, by the ridge 16 which penetrates into the interspace of the adjacent wires in parallel relation thereto.

FIGS. 8–11 show a modification of the gripping band described hereinabove. In this form of the invention, a gripping band 31 comprises an inner split ring 32 and an outer split ring 33 slidably mounted in a circumferential groove 34 formed in the outer peripheral surface of said inner split ring 32, and said inner split ring 32 has a gap 35 and a triangular prismatic ridge 36 formed on the inner peripheral surface at a location diametrically opposite to said gap 35, similar to the preceding embodiment. In the groove 34 of the inner split ring 32 is provided an ear 37 at a location opposite to the ridge 36. The outer split ring 33 is provided with through-holes 38 at locations adjacent the opposite ends thereof. This gripping band 31, similar to the preceding embodiment, is fitted around a bundle of wires by means of the charging device 20 described previously. After fitting the band around the bundle of wires, the outer split ring 33 is slidably rotated on the inner split ring 32 relative to the latter, along the groove 34, whereby one of the through-holes 38 is brought into interlocking engagement with the ear 37 and the relative movement is stopped. In this state, the gap 35 of the inner split ring 32 is closed by the outer split ring 33, so that the constituent wire or wires of the bundle are not allowed to slip out and the bundle of wires is effectively gripped by the gripping band.

I claim:
1. A gripping band for a bundle of wires, comprising in combination a resilient expansible inner split ring having a gap formed between the confronting ends thereof and having a continuous circumferential groove formed in the outer peripheral surface thereof, and a resilient expansible outer split ring having a gap formed between the confronting ends thereof and slidably fitted in the circumferential groove of said inner ring, the respective gaps of said inner and outer rings being able to be enlarged in cooperation therewith as the gaps are registered with each other to thereby fit the rings around said bundle of wires.

2. A gripping band for a bundle of wires as defined in claim 1, wherein said inner split ring has an ear provided on the bottom surface of said circumferential groove, while said outer split ring is provided with a through-hole for interlocking engagement with said ear to prevent relative rotation of said inner and outer split rings.

3. A gripping band for a bundle of wires as defined in claim 1, wherein said inner split ring has an axial ridge formed in the circumferential groove for abutting engagement with one end of said outer split ring to prevent relative rotation of said inner and outer split rings.

* * * * *